United States Patent
Prasad et al.

(10) Patent No.: US 8,872,647 B2
(45) Date of Patent: Oct. 28, 2014

(54) METHOD AND APPARATUS FOR CONTEXT ADAPTIVE MULTIMEDIA MANAGEMENT

(75) Inventors: Krishnaswamy Venkatesh Prasad, Ann Arbor, MI (US); Devinder Singh Kochhar, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 147 days.

(21) Appl. No.: 13/278,318

(22) Filed: Oct. 21, 2011

(65) Prior Publication Data
US 2013/0099915 A1 Apr. 25, 2013

(51) Int. Cl.
*B60Q 1/00* (2006.01)
*B60R 22/00* (2006.01)
*B60R 16/02* (2006.01)
*G06F 3/14* (2006.01)

(52) U.S. Cl.
CPC .. *B60R 16/02* (2013.01); *G06F 3/14* (2013.01)
USPC ............................................. 340/461; 701/45

(58) Field of Classification Search
USPC ............................. 701/45, 200, 301; 340/461
See application file for complete search history.

(56) References Cited

U.S. PATENT DOCUMENTS

| | | | |
|---|---|---|---|
| 4,988,996 A * | 1/1991 | Ito | 340/984 |
| 6,314,094 B1 | 11/2001 | Boys | |
| 6,574,531 B2 * | 6/2003 | Tan et al. | 701/1 |
| 6,587,127 B1 | 7/2003 | Leeke et al. | |
| 6,600,975 B2 * | 7/2003 | Moriguchi et al. | 701/1 |
| 6,788,196 B2 * | 9/2004 | Ueda | 340/459 |
| 6,812,942 B2 * | 11/2004 | Ribak | 345/30 |
| 6,842,677 B2 * | 1/2005 | Pathare | 701/36 |
| 7,159,000 B2 | 1/2007 | Plastina et al. | |
| 7,362,999 B2 | 4/2008 | Petschke et al. | |
| 7,552,009 B2 * | 6/2009 | Nelson | 701/425 |
| 7,567,861 B2 * | 7/2009 | Inagaki | 701/1 |
| 7,752,567 B2 * | 7/2010 | Hedrick | 715/771 |
| 7,764,247 B2 * | 7/2010 | Blanco et al. | 345/7 |
| 7,796,019 B2 * | 9/2010 | Yamada | 340/438 |
| 8,042,140 B2 | 10/2011 | Thomas et al. | |

(Continued)

FOREIGN PATENT DOCUMENTS

| | | |
|---|---|---|
| CN | 1917632 | 2/2007 |
| CN | 10139344 | 9/2007 |

(Continued)

OTHER PUBLICATIONS

Ford Motor Company, "SYNC with Navigation System," Owner's Guide Supplement, SYNC System Version 1 (Jul. 2007).

(Continued)

*Primary Examiner* — Hai Phan
*Assistant Examiner* — Royit Yu
(74) *Attorney, Agent, or Firm* — Jennifer M. Stec; Brooks Kushman P.C.

(57) ABSTRACT

In a first illustrative embodiment, a computer implemented method includes detecting a plurality of context providing devices accessible to a vehicle computing system. The illustrative method further includes evaluating context relevant information from each of the detected devices to compile a display. The illustrative method also includes outputting a compiled display to a vehicle display, including at least one portion of the display initially dedicated to vehicle-based service content and at least one portion of the display dedicated to content from a context providing device.

15 Claims, 3 Drawing Sheets

(56) References Cited

U.S. PATENT DOCUMENTS

| | | |
|---|---|---|
| 8,055,540 B2 | 11/2011 | Pudar |
| 8,120,478 B2 * | 2/2012 | Skaff et al. .................... 340/438 |
| 8,335,494 B2 * | 12/2012 | Wilkerson .................. 455/414.1 |
| 2002/0072326 A1 | 6/2002 | Qureshey |
| 2002/0085043 A1 * | 7/2002 | Ribak .......................... 345/810 |
| 2002/0188392 A1 * | 12/2002 | Breed et al. .................... 701/45 |
| 2004/0093155 A1 * | 5/2004 | Simonds et al. .............. 701/200 |
| 2004/0093299 A1 * | 5/2004 | Bodin et al. .................... 705/37 |
| 2004/0246940 A1 | 12/2004 | Kubler et al. |
| 2004/0249663 A1 | 12/2004 | Shishido |
| 2005/0024189 A1 | 2/2005 | Weber |
| 2005/0055372 A1 | 3/2005 | Springer, Jr. et al. |
| 2006/0293813 A1 | 12/2006 | Nou |
| 2007/0061057 A1 | 3/2007 | Huang et al. |
| 2007/0233725 A1 | 10/2007 | Michmerhuizen et al. |
| 2007/0299978 A1 | 12/2007 | Neumann et al. |
| 2008/0114664 A1 | 5/2008 | Harb |
| 2008/0218409 A1 | 9/2008 | Moinzadeh et al. |
| 2008/0319665 A1 * | 12/2008 | Berkobin et al. .............. 701/213 |
| 2009/0075624 A1 | 3/2009 | Cox et al. |
| 2009/0117890 A1 | 5/2009 | Jacobsen |
| 2009/0144622 A1 * | 6/2009 | Evans et al. .................... 715/706 |
| 2009/0222341 A1 | 9/2009 | Belwadi et al. |
| 2009/0228158 A1 * | 9/2009 | Medler et al. ...................... 701/1 |
| 2009/0319341 A1 | 12/2009 | Berkobin et al. |
| 2009/0326949 A1 | 12/2009 | Douthitt et al. |
| 2010/0241507 A1 | 9/2010 | Quinn et al. |
| 2010/0280956 A1 | 11/2010 | Chutorash et al. |
| 2010/0283626 A1 * | 11/2010 | Breed ....................... 340/825.49 |
| 2010/0305951 A1 | 12/2010 | Ostrowski et al. |
| 2010/0311345 A1 | 12/2010 | Santori et al. |
| 2010/0312369 A1 | 12/2010 | Dollar, Jr. |
| 2010/0330975 A1 | 12/2010 | Basir |
| 2011/0296037 A1 | 12/2011 | Westra et al. |
| 2012/0030470 A1 * | 2/2012 | Jdanov et al. .................. 713/176 |
| 2012/0095643 A1 * | 4/2012 | Bose et al. .................... 701/32.8 |
| 2013/0038635 A1 * | 2/2013 | Bales et al. .................... 345/660 |

FOREIGN PATENT DOCUMENTS

| | | |
|---|---|---|
| EP | 1137210 A2 | 9/2001 |
| GB | 2366055 A | 2/2002 |
| WO | WO2007123797 A1 | 11/2007 |

OTHER PUBLICATIONS

Ford Motor Company, "SYNC," Owners's Guide Supplement, SYNC System Version 1 (Nov. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

Ford Motor Company, "SYNC with Navigation System," Owner's Guide Supplement, SYNC System Version 3 (Jul. 2009).

Ford Motor Company, "SYNC," Owner's Guide Supplement, SYNC System Version 3 (Aug. 2009).

Kermit Whitfield, "A hitchhiker's guide to the telematics ecosystem," Automotive Design & Production, Oct. 2003, http://findarticles.com, pp. 103.

www.wired.com/entertainment/music/commentary/listeningpost/2005/11/69653, printed Sep. 4, 2008.

www.magic-tagger.com/eng/home.php, printed Oct. 31, 2008.

www.magnusbrading.com/mp3ts/main.html, printed Sep. 4, 2008.

www.softpointer.com/index.htm, printed Sep. 4, 2008.

* cited by examiner

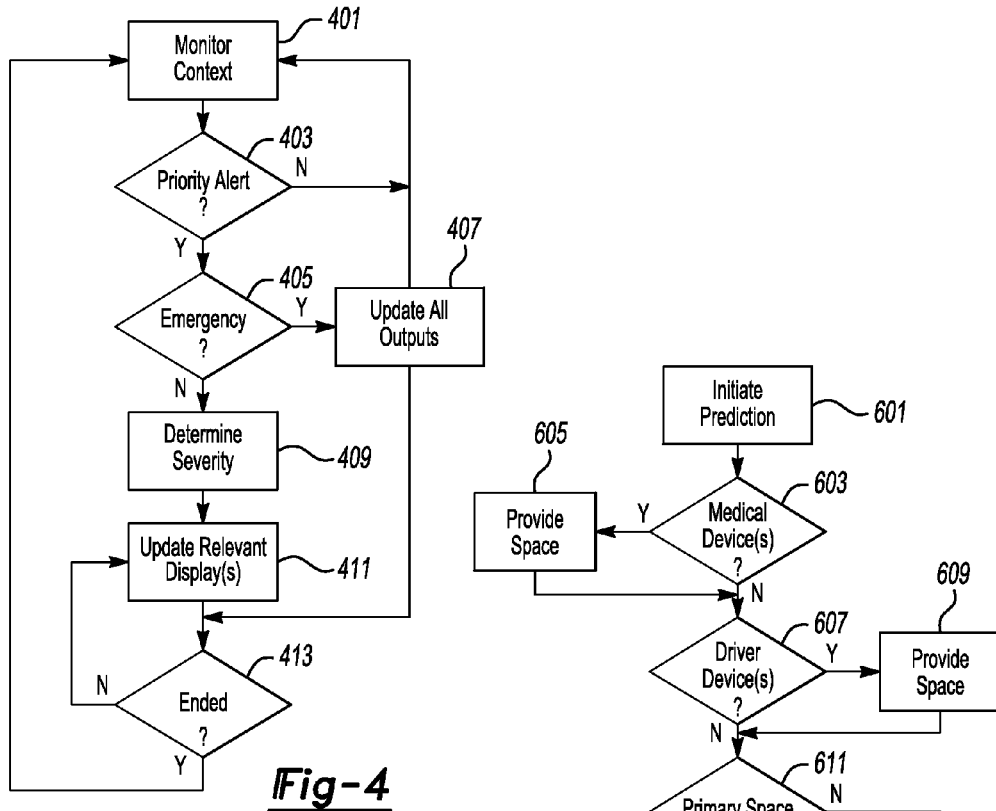
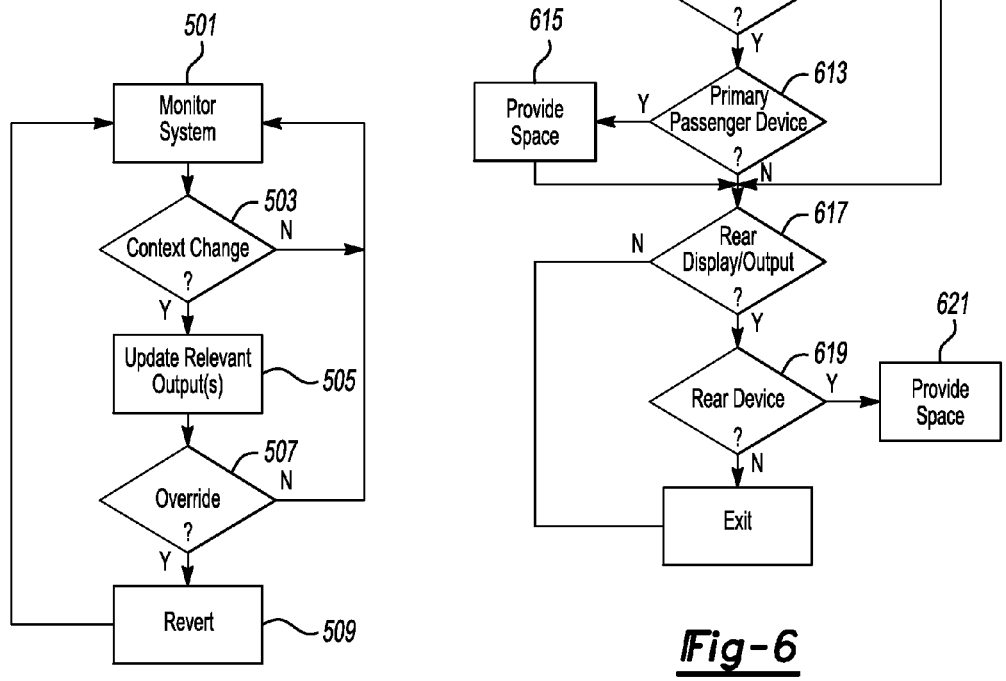

METHOD AND APPARATUS FOR CONTEXT ADAPTIVE MULTIMEDIA MANAGEMENT

TECHNICAL FIELD

The illustrative embodiments generally relate to a method and apparatus for context adaptive multimedia management.

BACKGROUND

Portable, wireless devices are used in countless aspects of everyday life. From the basic phones carried by millions of people, to advanced technological devices such as laptops and tablet computers, to wireless medical devices, at any given time a person can be singly transporting a veritable cornucopia of computing technology.

At the same time, vehicle computing capabilities and output devices have also been rapidly advancing and becoming more prevalent in the vehicles that people use in everyday transit. Advanced multimedia displays can be found, sometimes in several places, within vehicles, and wireless communication systems in conjunction with wireless devices and these displays allow access to resources far beyond those accessible in the typical automobile of twenty years past.

It would not be unusual for a family of four traveling in a vehicle to have four cellular phones, at least one portable computer or computer-like device, such as a tablet, and a portable game system. Further, the vehicle itself may have multiple media outputs, such as speakers, rear visual screens and a center stack mounted navigation display.

With so many media sources and outputs available, it could be difficult to manage content delivery to a particular display. If each device was independently operated, then this may be less of an issue, but there has been a push in modern multimedia environments to allow various devices to share content. In a vehicle, as much as anywhere else, the number and type of devices may be subject to frequent change, as passengers enter and exit a vehicle, and ride in varying configuration. In a non-mobile environment, such a problem could be addressed by requiring user configuration of device communication on a per-use instance, but in a vehicle environment this could lead to unwanted distractions for a driver.

SUMMARY

In a first illustrative embodiment, a computer implemented method includes detecting a plurality of context providing devices accessible to a vehicle computing system. The illustrative method further includes evaluating context relevant information from each of the detected devices to compile a display. The illustrative method also includes outputting a compiled display to a vehicle display, including at least one portion of the display initially dedicated to vehicle-based service content and at least one portion of the display dedicated to content from a context providing device.

In a second illustrative embodiment, a computer implemented method includes assembling an initial vehicle display based on context relevant information, the context relevant information including at least information relating to context sources including wireless devices present in the vehicle, occupants present in the vehicle, and vehicle-based services. The initial vehicle display includes at least information content relating to a plurality of the context sources.

The illustrative method also includes outputting the initial vehicle display to a vehicle display source and monitoring the context sources for changes in information relating to the sources. The illustrative method further includes evaluating the changes in information to assemble a new, varied display, the variance based at least in part on changes in information.

In a third illustrative embodiment, a computer readable storage medium stores instructions that, when executed by a processor, cause the processor to perform the method including detecting a plurality of context providing devices accessible to a vehicle computing system. The illustrative method also includes evaluating context relevant information from each of the detected devices to compile a display. Also, the illustrative method includes outputting a compiled display to a vehicle display, including at least one portion of the display initially dedicated to vehicle-based service content and at least one portion of the display dedicated to content from a context providing device.

BRIEF DESCRIPTION OF THE DRAWINGS

FIG. 4 shows an illustrative example of a content varying process;

FIG. 5 shows an illustrative example of another content varying process; and

FIG. 6 shows an example of a dynamic content management process.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
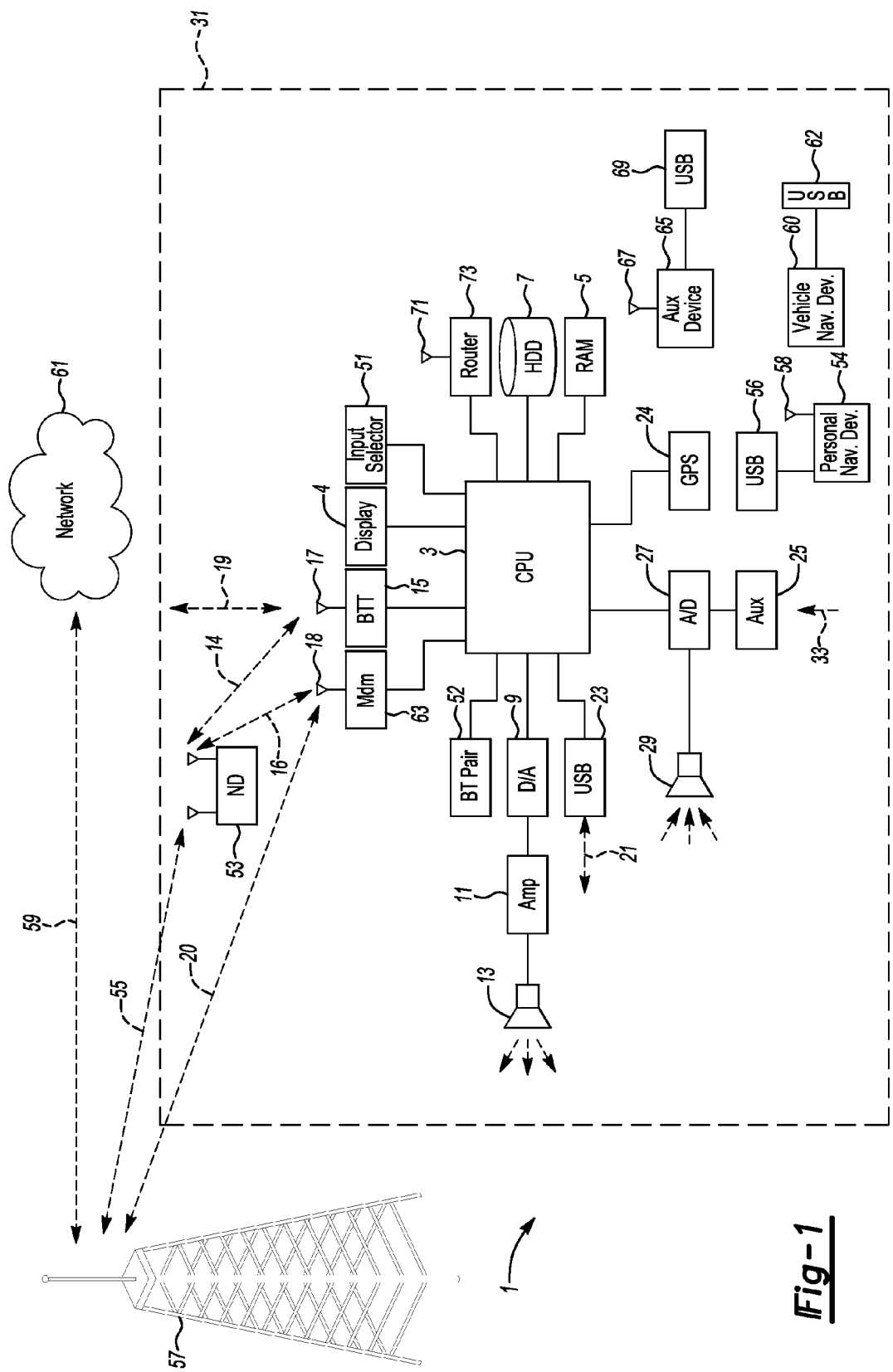
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domian Multiple Access (CDMA), Time Domain Multiple Access (TDMA), Space-Domian Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
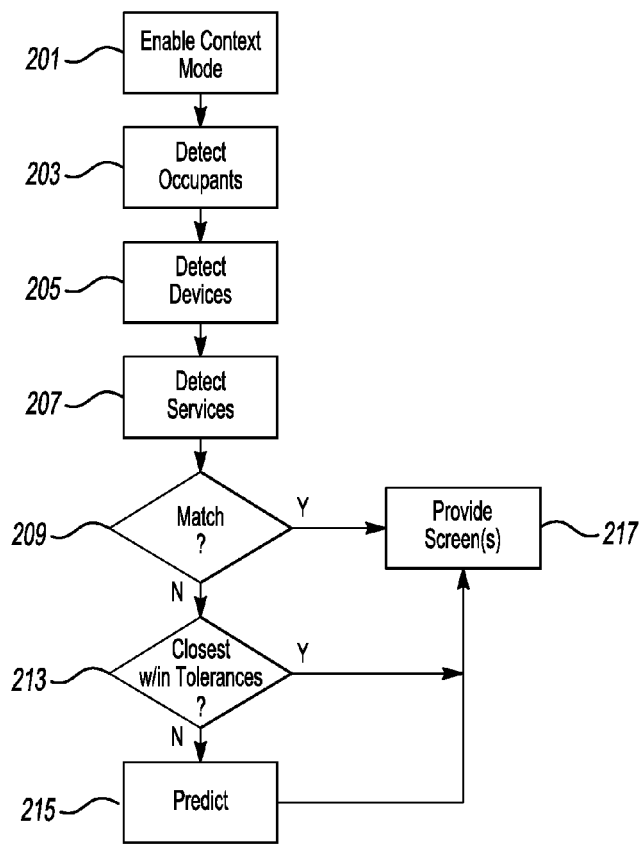
FIG. 2 shows an illustrative process for context relevant content delivery.

FIG. 2 shows an illustrative process for context relevant content delivery. In context relevant content delivery, the vehicle computing system considers a number of contextual sources before providing a media output to one or more vehicle outputs. A non-limiting list of context sources includes, number of passengers, identities of passengers, wireless phones in the vehicle, wireless medical devices in the vehicle, environmental factors, wireless computing devices in the vehicle, etc.

For example, a vehicle computing system may be able to determine that there are currently three people riding in a vehicle, one in a back seat and two in a front seat. The system may also know that there is a media display in the front center stack and a media display in each of the headrests. Since there is at least one passenger in the back seat, the system may consider use of at least one of the back seat displays. If a vehicle media system has both speaker and headphone outputs capable of playing different audio streams, it may consider assigning a headphone output for use in the back seat in conjunction with the one or more displays, and using the vehicle's general speaker system for a front radio or navigation output source.

Further, advanced vehicle computing systems may be able to identify particular passengers and retrieve known information about the preferences of those passengers. Favorite media can be queued up for delivery, radio presets can be changed, and preferences can be set based on previously entered setting preferences for each passenger. The preferences may further vary based on which passengers are sitting where in a vehicle.

Additionally, the vehicle computing system may be able to communicate with one or more wireless devices in the passengers' possession. Applications, multi-media, and communication functions can be temporarily integrated in dynamic fashion based on the presence of devices and/or preset user preferences.

Environmental considerations, such as traffic, weather, time of day, etc. can also be taken as context inputs, and may affect brightness of displays, levels of volume for outputs, and which devices/functions are given priority on one or more of the vehicle outputs. For example, a nice drive through the countryside on a sunny afternoon may allow a first set of output preferences, wherein a DvD is played in a back seat, through the vehicle speakers, and a front center display shows local tourist information and handles phone calls from a driver and/or passenger phone.

If, however, that same vehicle was being driven in a thunderstorm at 2 AM in heavy traffic, the front display may shift focus to weather/traffic information and the vehicle audio may be prioritized to navigation/weather related output. The decision to make these changes may also be based on which passengers are in a vehicle. For example, in the sunny afternoon scenario, the display may still be focused on traffic and weather if only a single occupant, the driver, is present.

In FIG. 2, the process enables a context aware output control mode 201. This mode will evaluate one or more contexts to determine the configuration, presentation and usage of vehicle outputs (such as, but not limited to, audio systems, multimedia displays, radio displays, etc.). The particular contexts may be manufacturer determined and/or they may be preset by users of the vehicle if changes are desired to standard configurations.

In this exemplary process, the process will, using existing vehicle systems, detect a number of occupants 203. In vehicles with appropriate identification capability, the process may also detect the specific identities of the vehicle occupants. In another embodiment, the vehicle may "guess" information about unknown occupants based on predictions stemming from, for example, height and/or weight considerations (e.g., without limitation, a four foot tall, seventy pound passenger is probably a child). Vehicle camera systems, weight sensors and other devices can be used to obtain this information.

In addition to determining the number of and/or identities of the passengers, the process may determine what devices are present in the vehicle 205. These can include, but are not limited to, wireless phones, wireless/BLUETOOTH capable medical devices, portable computers, tablets (tablet PCs, IPADs, etc.), wireless gaming systems, etc. Some or all of the devices may have been paired with the system at a previous point, depending on the communication medium used, and other devices may have the capability to pair with the system or transmit information to the system in the absence of pairing.

Also, the process may determine what services are available to the passengers 207. These can include, but are not limited to, weather related services, navigation services, traffic based services, content delivery services, medical assistance services, etc.

In this example, although not shown as separate steps, as each source of context is determined, the process may also log relevant information relating to that context source. For example, if certain passengers are detected, known information about passenger preferences may be loaded. If certain media devices are loaded, information relating to the preferred display/output of data relating to those media devices may be loaded.

Detection of certain services may cause information from those services to be determined/loaded. For example, without limitation, if a traffic service is detected, traffic for a travel route may be loaded to determine if the volume of traffic provides a context state that could adjust content output/display. The same can be done for weather, medical assistance, and any other relevant services.

Other sources of context may also be detected and the examples discussed with respect to this process are for example only.

Once all the relevant context sources have been detected and analyzed, the process determines if a preconfigured match for output exists 209. For example, without limitation, if a driver is driving alone, with a cellular phone and a blood sugar monitor, the driver may want any incoming calls displayed on a small portion of a display, a majority of a display dedicated to navigation, and another portion of the display to show a blood sugar level. Incoming calls may cause the portion of the display dedicated to the call to temporarily enlarge to notify the driver of the call, and may also cause the vehicle audio system to shift into a call-handling mode.

At the same time, if the driver is in the car with his wife, her phone may be given some portion of priority on the display. Additionally, her multimedia device (IPOD, etc.) may be given play priority and have a portion of the display dedicated to that. If traffic or weather worsens, the display may shift to a more nav/weather focused format. If the driver's blood sugar monitor sends an alarm, the entire display may be temporarily dedicated to the alert.

If a pre-configured match/preference setting exists, the process provides the appropriate display and other outputs 217. If not, the system checks to see if there is a set of settings within a reasonable tolerance that would allow a good "guess" as to which display was preferred. For example, in the above instance, if all devices except for a blood sugar monitor were present, the system could reasonably approximate the preferred display without the medical device shown. On the other hand, if the context doesn't correspond to any recognizable configuration, the process can "predict" what the driver would prefer. The prediction can be based on other configurations already stored, driver changes to previous predictions, and other known information about contexts and driver preferences. The driver could even be given the option to "save" a configuration for a given overall context so that the configuration would be used in future situations when that same context occurred.

Figure 3:
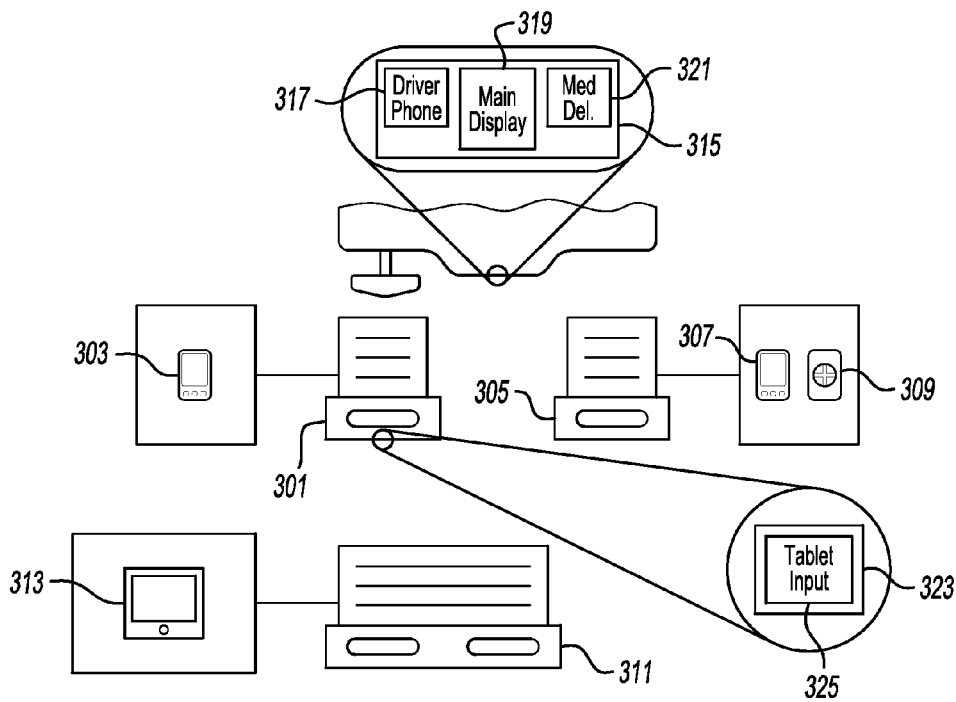
FIG. 3 shows an illustrative example of a vehicle/passenger configuration and content output.

FIG. 3 shows an illustrative example of a vehicle/passenger configuration and content output. In this illustrative example, there is a front driver seat 301, a front passenger seat 305 and a rear passenger seat 311. For purposes of this example, it is assumed that occupants are sitting in the driver seat, front passenger seat, and rear seat behind the driver.

In this example, the driver has a wireless device, such as a cellular phone 303. The passenger in the front seat has both a cellular phone 307 and a wireless medical device 309. The passenger in the back rear has a tablet device 323. Position of the various wireless devices can be detected using known techniques, such as, but not limited to, near field communication. In at least one embodiment, certain passengers under driving ages are associated with wireless devices and are known in advance to be non-drivers based on a personal profile.

Also in this vehicle, there are multiple media displays. There is a center stack display 315 and a rear display 325. A second rear display (not shown) may also be present. According to, in this embodiment, predefined settings, the vehicle computing system executes a process that gathers all the relevant context and causes the displays to operate as shown (at least initially). In this embodiment, that corresponds to the primary center stack display showing driver phone information 317, a navigation display 319 and a medical device display 321. This display is capable of changing as relevant context changes occur. For example, if the driver disables his wireless phone, the display may no longer display phone information. Or, for example, if the driver does not utilize navigation, the navigation display may be removed and greater display space may be dedicated to the wireless phone (s) and the medical device. If there is a traffic tracking service available, however, and the driver's current location and/or estimated heading is likely to encounter traffic, the navigation display may be restored as long as the traffic situation persists in relevant proximity to the vehicle position.

If the wireless medical device 309 reports an emergency condition, one or both of the displays may display a report of the condition in greater detail, to warn the driver/passengers about the onset of the condition. In the meantime, in this example, the rear display replicates the tablet output (if desired) 325, or possible displays a movie playing on the tablet or on a vehicle content delivery system.

FIG. 4 shows an illustrative example of a content varying process. In this illustrative example, an initial content display has been originated at some point prior to the initiation of this process. This process begins by initially monitoring system context 401. In this example, the system is monitoring at least one context source for a priority alert 403. This priority alert could correspond, for example, without limitation, to a medical device alert, a severe weather alert, a traffic accident alert, an amber alert, etc.

If an emergency condition occurs 405, the process may update all displays 407. Different alerts may warrant a change to varying displays, with some conditions corresponding to an update to all displays, whereas other, less severe or driver relevant only conditions may only cause an update of one or more displays provided to the front of the vehicle.

If the condition is not an emergency condition, the severity (and/or relevance) of the alert condition is determined 409. Relevant displays are then updated 411. In both display update instances, the process considers if the alert conditions have ended 413 before resuming the initial display state (or other now-relevant display state).

FIG. 5 shows an illustrative example of another content varying process. In this example, one or more displays may be updated due to a change in context. For example, without limitation, a phone or other device may be disabled or enabled, and incoming call or message may occur, a navigation system may be enabled, etc.

Again, the process monitors the various context sources and also considers the possibility of new context sources 501 (such as, for example, if a new device is enabled that was not previously detected). When a context change is detected 503, relevant outputs may be updated 505.

For example, without limitation, a driver's phone may have a priority of display associated therewith. But, when the driver enters the vehicle, the phone may be disabled, so a lower priority context display may occur. In this instance, the vehicle may not even be aware that the driver's phone is present in the vehicle (depending on detection techniques employed).

At some point during a journey, the driver may enable the device, thus changing the context priority settings. Since the driver's phone would have been initially displayed, a context content setting corresponding to that display may now be the relevant or higher ranked setting. Accordingly, given the context shift, the process would update, for example, a primary center stack display 505 to show information relating to the driver's wireless phone.

It also may be the case, in this example, that the display shift is not desired (for example, if the primary display is being used in a desired manner at the time, and the driver or other passenger does not want the shift in content to occur). Accordingly, in this example, an over-ride option is presented in conjunction with the content shift 507. If the over-ride is not desired, the new content display will be maintained, otherwise the display may revert to display of the previous set of content 509.

This is just one example of how a content shift may occur based on a change of context while the vehicle is in motion. Other examples include, but are not limited to, change in other devices, alert conditions, service updates (e.g., without limitation, traffic, weather, etc.), time changes, etc.

FIG. 6 shows an example of a dynamic content management process. In this illustrative example, the system has completed an analysis of all the available contexts, but cannot determine a preset display state corresponding to these contexts. This could be because display states have not been preset, or because the preset states do not account (in a precise or a suitably approximate manner) for the existing, detected, analyzed contexts.

In this example, the process initiates a prediction routine designed to "guess" at a suitable use of vehicle outputs 601. First, in this example, the process considers whether medical devices are present 603. Although a predetermined list of considered devices is employed in this process, the order of considered devices could vary based on, for example, previously observed or set vehicle preferences.

If one or more medical devices are present, the system may allocate some portion of a display to relevant outputs of those devices 605. Prior to consideration of this, some portion of the display may have also been allocated or set aside for common functions such as, but not limited to, a navigation display. Again, predictive algorithms can be based on input preferences and/or preset conditions.

Next, the process determines if any driver devices are present 607. As previously noted, determination of whether a device belongs to a driver can be determined by, for example, recognition of a known device, near field communication, etc. If driver devices are present, space corresponding to those devices may be provided 609 in one or more displays or outputs. If no space is available, due to, for example, all available space having been used in a reasonable manner to account for other services and devices, the driver device space may not be provided, but could, for example, be given a priority of display if a context shift occurs (for example, without limitation, if navigation is no longer needed).

Next, in this process, the system determines whether additional space remains 611 (although this decision could be made between all device checks, or at any needed time). Although remaining device inputs are not considered in this example, if no space remains (or other output capacity), the devices were all previously considered as context sources, so the system remains aware of the devices and can adjust content as needed based on context changes.

If there is still usable display/output available, the system checks to see if any primary passenger devices are available 613. If so, and/or if there are devices that are "usable" or desirable for output, the system allocates the appropriate display/output 615.

Also, in this example, the process determines if rear displays or outputs are available 617. These could include, but are not limited to, rear displays, rear speakers (on a different channel from front speakers), rear headset outputs, etc. If there is a rear device 619 and usable outputs desirable for content provision based on known context (which could also include non-rear devices, such as, for example, a dvd player), the process will provide the appropriate content to the suitable outputs 621.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A computer-implemented method comprising:
    detecting a plurality of context-providing devices accessible to a vehicle computing system;
    evaluating context-relevant information from each of the detected devices;
    compiling a display based on the evaluated context-relevant information from each of the detected devices;
    outputting a compiled display to a vehicle display, wherein the vehicle display includes a display-portion initially dedicated to vehicle-based service content and a display-portion dedicated to content from one of the plurality of context-providing devices.

2. The method of claim 1, wherein the relative size of each at least one portion of the display relates to a weighting of evaluated context relevant information.

3. The method of claim 2, wherein the weighting is based at least in part on user-defined preferences.

4. The method of claim 2, further comprising:
    detecting one or more vehicle occupants;
    evaluating context relevant information relating to the one or more vehicle occupants; and
    wherein the weighting of evaluated context relevant information varies based at least in part between differing compositions of occupants.

5. The method of claim 4, wherein the context relevant information relating to one or more vehicle occupants includes the identities of at least one of the vehicle occupants.

6. The method of claim 5, wherein the context relevant information relating to one or more vehicle occupants includes output preferences relating to identified vehicle occupants.

7. The method of claim 4, wherein the context relevant information relating to one or more vehicle occupants includes an estimation of which of the vehicle occupants are children and which of the vehicle occupants are adults, based at least in part on vehicle sensor information.

8. The method of claim 2, further comprising:
    detecting one or more environmental conditions;
    evaluating context relevant information relating to the one or more environmental conditions;
    and wherein the weighting of evaluated context relevant information varies based at least in part with a variance in the one or more environmental conditions.

9. The method of claim 2, further comprising:
    evaluating context relevant information relating to one or more vehicle-based services; and
    wherein the weighting of evaluated context relevant information varies based at least in part on information available from the one or more vehicle-based services.

10. The method of claim 9, wherein the weighting of evaluated context relevant information varies based at least in part on a driver's input request for use of the one or more vehicle based services after the vehicle has been started.

11. The method of claim 1, further comprising:
    monitoring the context relevant information to detect a change in the state of at least some portion of the context relevant information;
    upon detection of a change in the state of at least some portion of the context relevant information, re-evaluating the context relevant information to determine if a change in display state is appropriate, the change in display state corresponding to a display of information in differing relative proportion from an initial display.

12. The method of claim 11, wherein at least one change of state corresponds to an emergency condition, and wherein the change in display state corresponds to a largest portion of a display being utilized to display information about the emergency condition.

13. A non-transitory computer readable storage medium storing instructions that, when executed by a processor, cause the processor to perform the method comprising:
    detecting a plurality of context-providing devices accessible to a vehicle computing system;
    evaluating context-relevant information from each of the detected devices;
    compiling a display based on the evaluated context-relevant information from each of the detected devices;
    outputting a compiled display to a vehicle display, wherein the vehicle display includes a display-portion initially dedicated to vehicle-based service content and a display-portion dedicated to content from one of the plurality of context-providing devices.

14. The computer readable storage medium of claim 13, wherein the relative size of each at least one portion of the display relates to a weighting of evaluated context relevant information.

15. The computer readable storage medium of claim 14, wherein the weighting is based at least in part on user-defined preferences.

* * * * *